United States Patent [19]

Takahashi

[11] Patent Number: 5,050,547
[45] Date of Patent: Sep. 24, 1991

[54] CYLINDER SLEEVE FOR ENGINE

[75] Inventor: Masanori Takahashi, Hamamatsu, Japan

[73] Assignee: Sanshin Kogyo Kabushiki Kaisha, Hamamatsu, Japan

[21] Appl. No.: 547,493

[22] Filed: Jul. 3, 1990

[30] Foreign Application Priority Data

Jul. 3, 1989 [JP] Japan .................................. 1-169955

[51] Int. Cl.⁵ ............................................... F02F 1/00
[52] U.S. Cl. .............................. 123/193 C; 29/888.061
[58] Field of Search .......... 123/41.84, 193 C, 193 CP, 123/668, 669; 29/888.061

[56] References Cited

U.S. PATENT DOCUMENTS

| 2,062,394 | 12/1936 | Brown | 123/193 C |
| 2,414,931 | 1/1947 | Colwell et al. | 29/888.061 |
| 4,393,821 | 7/1983 | Urano | 29/888.061 |

Primary Examiner—Noah P. Kamen
Attorney, Agent, or Firm—Ernest A. Beutler

[57] ABSTRACT

Several embodiments of cylinder liners for reciprocating machines that have the plating on the inner surface formed in such a way that the plating will not extend to the top end of the sleeve at the time the end surface of the sleeve is machined for final fit to insure that this final end machining will not strip any plating material from the inner surface of the liner.

14 Claims, 3 Drawing Sheets

CYLINDER SLEEVE FOR ENGINE

BACKGROUND OF THE INVENTION

This invention relates to a cylinder sleeve for a reciprocating machine such as an engine and to a method for making such a sleeve.

In many instances, reciprocating machines are formed from a cylinder block in which cylinder liners are employed. Frequently it is the practice to plate the inner surface of a cylinder liner with a more resistant material. When so plating a cylinder liner, the plating normally extends to the top and bottom ends of the liner. It is also the practice to machine at least the top end of the liner so that when it is placed in the cylinder block the liner surface will be flush with the top deck of the block. However, when the machining of the plated liner takes place, there is a danger that the plating may be stripped from the interior of the liner or at least portions of it. This can give rise to obvious problems.

It is, therefore, a principal object of this invention to provide an improved plated liner for a reciprocating machine.

It is a further object to provide a method of plating and machining a liner for a reciprocating machine that will insure that the plating does not become displaced during subsequent machining of the top surface of the liner.

SUMMARY OF THE INVENTION

A first feature of the invention is adapted to be embodied in a cylinder liner for a reciprocating machine comprised of a generally circular sleeve formed from a first material. The cylindrical sleeve has an inner bore that is adapted to slidably receive a piston and an upper end portion that is adapted to engage means for forming a compression seal. A wear resistant plating is formed on the inner bore of the liner and the plating terminates at a location such that machining of the upper end portion will not remove the plating.

The invention is also adapted to be embodied in a method of making a cylinder liner for a reciprocating machine comprising forming a sleeve from a first material and having a generally cylindrical inner surface adapted to receive a piston. The sleeve has an end surface to be machined, and when so machined forms a surface to cooperate with a compression seal. The plating is applied to the inner surface in a manner to prevent removal of the plating upon machining of the end surface in accordance with the invention.

DETAILED DESCRIPTION OF THE PREFERRED EMBODIMENTS OF THE DRAWINGS

Figure 1:
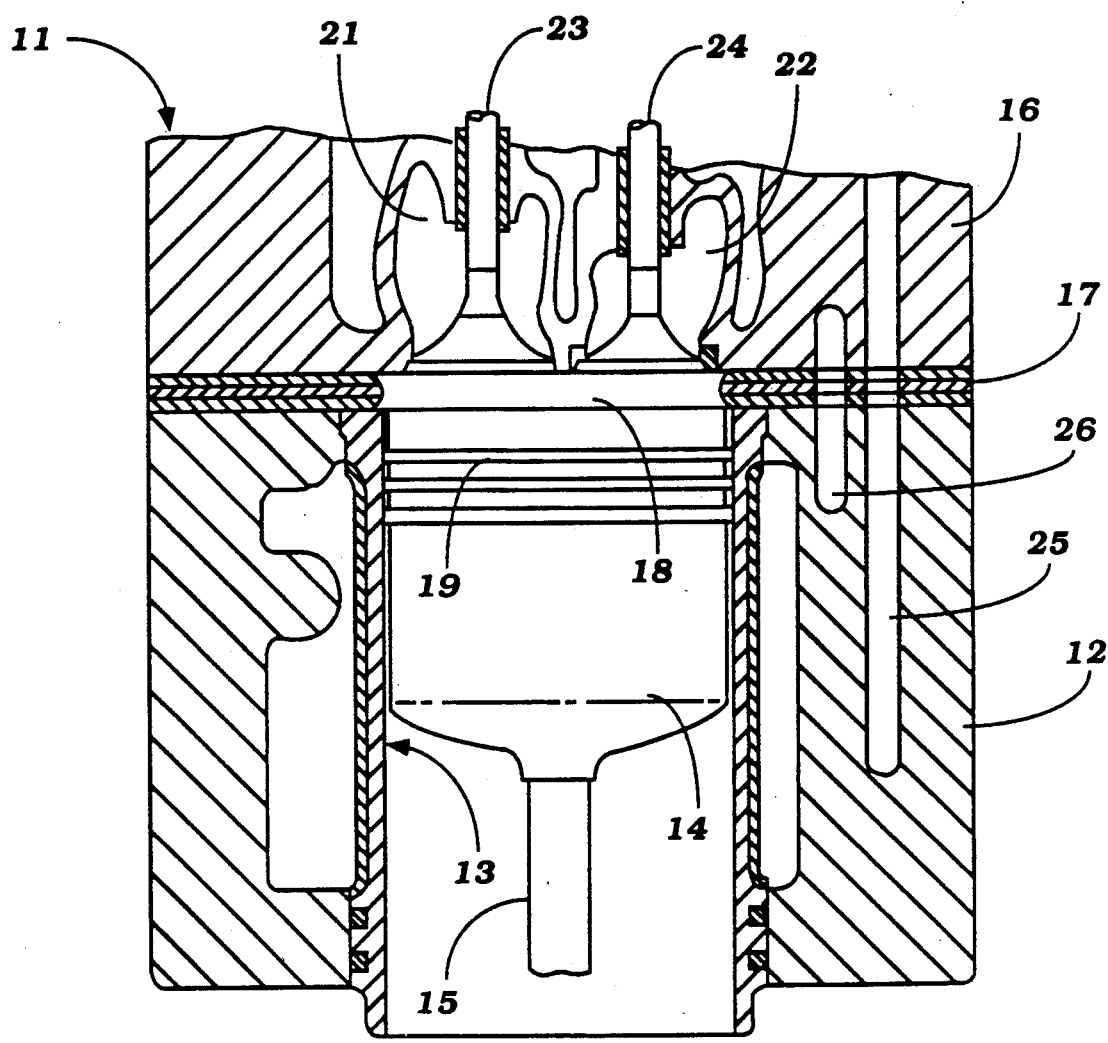
FIG. 1 is a cross sectional view taken through the single cylinder of an internal combustion engine having a liner constructed in accordance with any of the embodiments of the invention.

Referring first to FIG. 1, an internal combustion engine is shown in cross section through one of its cylinders and is identified generally by the reference numeral 11. The invention is described in conjunction with an internal combustion engine because it has particular utility in such reciprocating machines. It is to be understood, however, that the invention also may be utilized in some forms of rotary machines wherein there is provided a plated cylinder liner that has one of its ends machined so as to accommodate a sealing surface.

The engine 11 is comprised of a cylinder block 12 having one or more cylinder bores in which liners, indicated generally by the reference numeral 13 are positioned. A piston 14 reciprocates within the liner 13 and is connected by means of a connecting rod 15 to drive a crankshaft (not shown) in a known manner.

A cylinder head 16 is affixed to the cylinder block 12 in a known manner with a cylinder head gasket 17 being interposed between the cylinder 16 and cylinder block 12 for sealing the cylinder bores in a known manner. A combustion chamber 18 is thus formed between the head of the piston 14, the cylinder bore formed by the liner 13 and the cylinder head 16 which is sealed by the cylinder head gasket 17. Piston rings 19 are fixed in grooves in the piston 14 for effecting a sliding seal with the internal surface of the cylinder liner 13.

If the machine 11 is of the valved type, it may be provided with an intake port 21 and an exhaust port 22 in its cylinder head which are controlled, respectively, by intake and exhaust valves 23 and 24. In addition, if the machine 11 is water cooled, the cylinder block and cylinder head may be provided with a cooling jacket 25 with one or more passages 26 that extend between the cylinder block and cylinder head for transfer of coolant therebetween.

Figure 2:
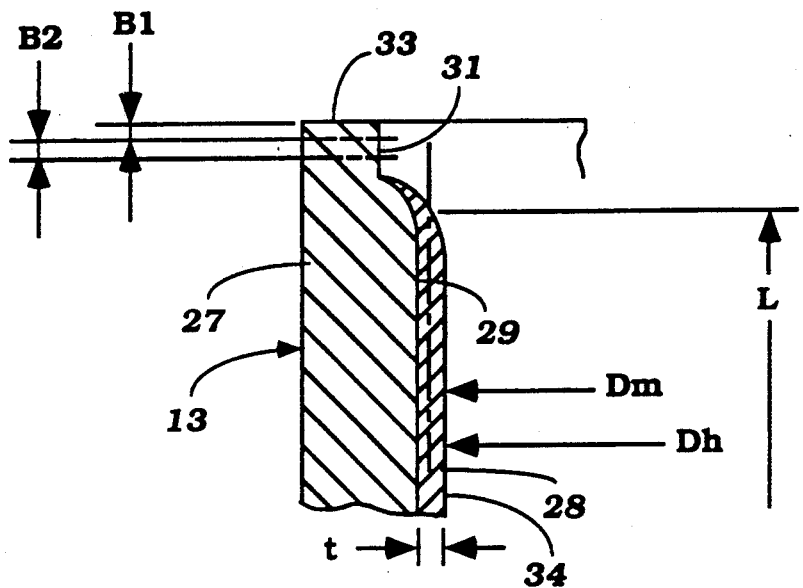
FIG. 2 is a partial cross sectional view taken through a cylinder sleeve constructed in accordance with an embodiment of the invention.

It is believed that further description of the machine per se is not necessary to permit those skilled in the art to understand how the invention is practiced. However, it should be noted that, in accordance with the invention, the cylinder liner 13 is provided with a plated inner surface. The liner 13 may be formed from a base portion or sleeve 27, as seen in FIG. 2, that is formed from a material such as an aluminum or aluminum alloy and which has a plated inner surface 28 formed from a more wear resistant material. As may be readily apparent from FIG. 1, the piston rings 19 do not sweep the full cylinder bore area of the liner 13 but only travel upwardly therein to a distance indicated by the dimension L in FIG. 2. This is significant in accordance with the invention, as now will be described.

In forming the cylinder liner in accordance with this invention, the sleeve 27 is formed with a counter bore consisting of a first, smaller diameter portion 29 and a second, larger diameter portion 31 which are joined by a radius 32. The portion 31 is formed adjacent the upper deck 33 of the cylinder liner 13 and specifically of the sleeve material 27. In accordance with the invention, the plating material 28 is formed initially to a depth t so as to provide an inner surface 34 that is slightly less than the finished bore diameter of the machine. It should be noted that the plating material 28 extends only up through the radius portion 32 and not on the larger diameter portion 31 of the sleeve 27. As a result, when the upper end 33 of the sleeve 27 is machined either to the depth B1 or an additional machining step to the depth B2, the plating 28 will not be acted upon by the machining operation.

The finished bore is then honed from the diameter Dm to the final bore diameter Dh and this removes a portion of the plating 28. It should be noted that the honing operation may be done before or after the end face 33 is machined. As a result of this construction, the end machining will not at all attack or strip away any of the plating layer 28. Thus it will be insured that the plating will stay in place for the full life of the engine.

Figure 3:
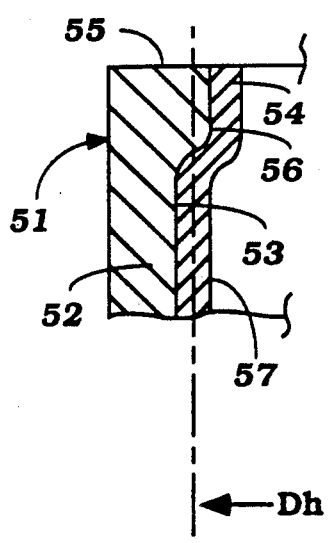
FIG. 3 is a partial cross sectional view, in part similar to FIG. 2, showing another embodiment of the invention as it appears immediately after plating.
Figure 4:
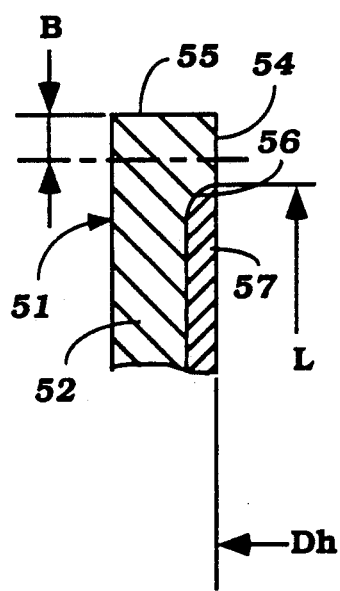
FIG. 4 is a cross sectional view of this embodiment after the inner bore of the liner has been finish formed.
Figure 5:
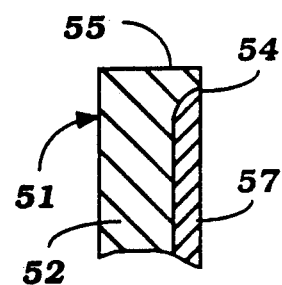
FIG. 5 is a partial cross sectional view after the top surface of the liner has been machined.

FIGS. 3 through 5 show the steps in sequence of forming a cylinder liner in accordance with another embodiment of the invention, wherein the liner is indicated generally by the reference numeral 53. The liner is comprised of a sleeve 52 that may be formed of any of the aforenoted materials and which has a larger diameter portion 53 and a smaller diameter portion 54 formed adjacent its end face 55. A round 56 joins the sections 53 and 54. It should be noted that the diameter of the portion 53 is greater than the finished bore diameter Dh of the engine, while the diameter of the portion 54 is less than the finished bore diameter. A plating layer 57 is then deposited on the complete inner surface of the bore including the portions 53, 54 and 56 (FIG. 3).

The bore is then finished honed to the bore diameter Dh as shown in FIG. 4 so that the portion of the plating covering the sleeve part 54 will be removed as will a portion of the plating covering the the curved portion 56. However, the bulk of the plating layer 57 is left in place. Again, it should be noted that the plating 57 remains in the area L swept by the piston rings. The end surface 55 of the liner is then removed by machining to the depth B so as to provide the finished end surface as shown in FIG. 5. It should be noted, however, that this machining operation, like the other embodiments, does not remove any of the plating 57. Hence there will be no problem of stripping the plating from the finished liner.

Figure 6:
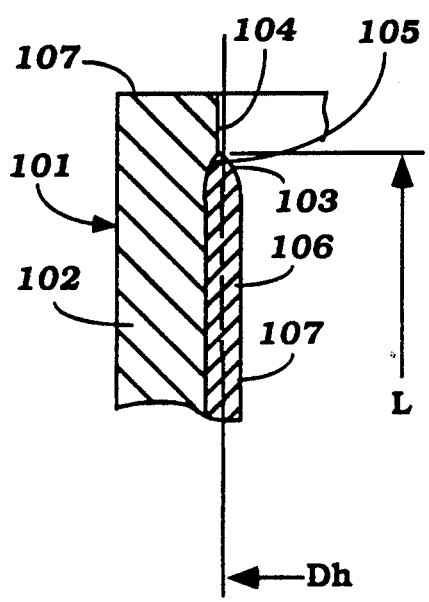
FIG. 6 is a partial cross sectional view, in part similar to FIGS. 2 through 5, and shows another embodiment of the invention.

FIG. 6 shows another embodiment of the invention which is somewhat similar to the embodiment of FIGS. 3 through 5. However, in this embodiment, the cylinder liner, indicated generally by the reference numeral 101, is formed initially from a sleeve 102 having a first bore portion 103 that is larger than the finished bore Dh and a second bore portion 104 which is also larger than the finished bore portion Dh but which is lesser than the portion 103. A slight round 105 connects these portions 103 and 104. A plating layer 106 is then formed on the portion 103 and a portion of the round 105 to an inner diameter 107 which is less than the finished bore dimension Dh. As a result, the finished honing operation will remove only the plating material and when the end surface 108 is finished machined, the plating will not be touched.

Figure 7:
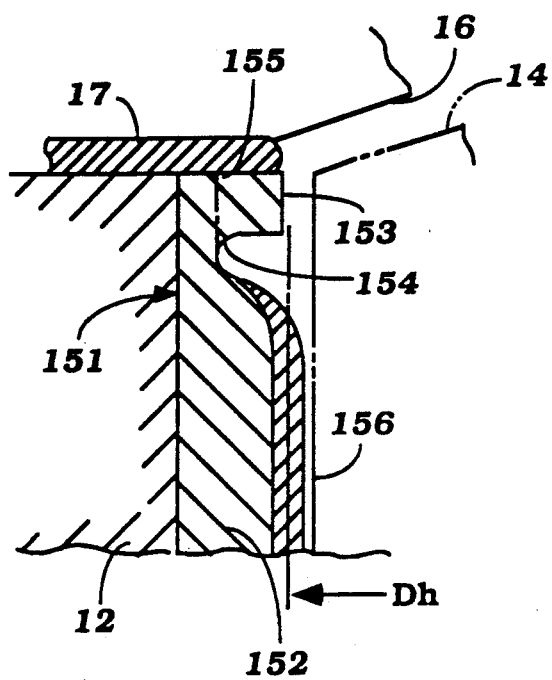
FIG. 7 is a partial cross sectional view, in part similar to FIGS. 2 through 6, and shows another embodiment of the invention.

FIG. 7 shows still another embodiment of the invention and in this embodiment the liner, indicated generally by the reference numeral 151 is shown in place in the cylinder block 12 with the cylinder head gasket 17 in place and the cylinder head 16 shown partially along with the piston 14. In this embodiment, the cylinder liner 151 is formed from a sleeve portion 152 which may be of any of the aforenoted materials and which is formed with a uniform bore 153 with a relief 154 being formed adjacent its top surface 155. The relief 154 is located so that it will still be positioned above the dimension L when the end face 155 is finished machined. A plating layer 156 is then formed below the relief 154 and extending partially into it so that when the finished honing operation is achieved to achieve the finished dimension to the dimension Dh, only the plating layer 156 will be removed.

Figure 8:
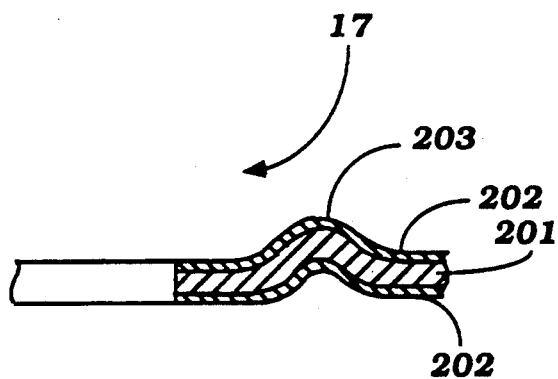
FIG. 8 is a cross sectional view of a cylinder head gasket adapted to be employed with any of the liners constructed in accordance with the invention.

FIG. 8 shows an embodiment of cylinder head gaskets 17 that may be utilized in conjunction with any of the liners of the embodiments of FIGS. 2, 3 through 5, 6 or 7. The gasket 17 is formed with a center layer 201 with metal clad surfaces 202 on its top and bottom. An embossed area 203 is formed around each of the cylinder bores so as to improve compression of the gasket and sealing in this area.

It should be readily apparent from the foregoing descriptions that the embodiments of the invention are particularly adapted to provide cylinder liners and methods of manufacturing them wherein machining of the end surface will not at all attack and strip away the plating of the inner bore. Although a number of embodiments of the invention have been illustrated and described, various changes and modifications may be made without departing from the spirit and scope of the invention, as defined by the appended claims.

I claim:

1. A cylinder liner for a reciprocating machine having a piston having means for sealing engagement with said cylinder liner, said liner comprising a generally cylindrical sleeve formed from a first material, said cylindrical sleeve having an inner bore adapted to slidably receive the piston and an upper end portion adapted to engage means for forming a compression seal, and a wear resistant plating formed on said inner bore through substantially the entire area engaged by the means of the piston having sealing engagement, said plating terminating at a location such that machining of the upper end portion will not remove the plating.

2. A cylinder liner as set forth in claim 1 wherein the plating terminates short of the upper end of the sleeve.

3. A cylinder liner for a reciprocating machine comprising a generally cylindrical sleeve formed from a first material, said cylindrical sleeve having an inner bore adapted to slidably receive a piston and an upper end portion adapted to engage means for forming a compression seal, and a wear resistant plating formed on said inner bore, said plating terminating short of the upper end of said sleeve such that machining of the upper end portion will not remove the plating, said sleeve being formed with a counter bored portion adjacent its upper end and said plating does not extend into the counter bored portion.

4. A cylinder liner for a reciprocating machine comprising a generally cylindrical sleeve formed from a first material, said cylindrical sleeve having an inner bore adapted to slidably receive a piston and an upper end portion adapted to engage means for forming a compression seal, and a wear resistant plating formed on said inner bore, said plating terminating short of the upper end of said sleeve such that machining of the upper end portion will not remove the plating, said sleeve being provided with a groove adjacent its upper end and said plating only extends to the groove.

5. A cylinder liner for a reciprocating machine comprising a generally cylindrical sleeve formed from a first material, said cylindrical sleeve having an inner bore adapted to slidably receive a piston and an upper end portion adapted to engage means for forming a compression seal, and a wear resistant plating formed on said inner bore, said plating terminating short of the upper end of said sleeve such that machining of the upper end portion will not remove the plating, said sleeve being provided with a bore having a diameter greater than the finished bore diameter of the liner and which has a smaller diameter portion adjacent its upper end with the plating only being positioned on the larger diameter portion.

6. A cylinder liner for a reciprocating machine comprising a generally cylindrical sleeve formed from a first material, said cylindrical sleeve having an inner bore adapted to slidably receive a piston and an upper end portion adapted to engage means for forming a compression seal, and a wear resistant plating formed on said inner bore, said plating terminating short of the upper end of said sleeve such that machining of the upper end portion will not remove the plating, said plating being initially formed on the entire inner surface of the cylindrical sleeve and being machined off of the top end thereof prior to machining of the top end.

7. A cylinder liner as set forth in claim 6 wherein the cylindrical sleeve is provided with a smaller diameter portion adjacent its upper end which smaller diameter portion is less than the finished bore diameter and the larger diameter portion spaced from the upper end, which portion is larger than the finished bore diameter, and the plating is formed to a substantially uniform thickness on both ends and wherein the plating from the top end portion and a portion of the top end is removed on finished honing.

8. The method of making a cylinder liner for a reciprocating machine comprising forming a sleeve from a first material and having a generally cylindrical surface adapted to receive a piston, said sleeve having an end surface to be machined and when so machined to form a surface to cooperate with a compression seal, and plating at least the entire length of said inner surface engaged by the piston and in a manner to prevent removal of said plating upon machining of said end surface.

9. A method as set forth in claim 8 wherein the plating terminates short of the upper end of the sleeve.

10. A method of making a cylinder liner for a reciprocating machine comprising forming a sleeve from a first material and having a generally cylindrical surface adapted to receive a piston, said sleeve having an end surface to be machined and when so machined to form a surface to cooperate with a compression seal, and plating said inner surface in a manner to prevent removal of said plating upon machining of said end surface by terminating the plating short of the end of the sleeve, the sleeve being formed with a counter bored portion adjacent its upper end and the plating does not extend into the counter bored portion.

11. A method of making a cylinder liner for a reciprocating machine comprising forming a sleeve from a first material and having a generally cylindrical surface adapted to receive a piston, said sleeve having an end surface to be machined and when so machined to form a surface to cooperate with a compression seal, and plating said inner surface in a manner to prevent removal of said plating upon machining of said end surface by terminating the plating short of the end of the sleeve, the sleeve being provided with a groove adjacent its upper end and the plating only extends to the groove.

12. A method of making a cylinder liner for a reciprocating machine comprising forming a sleeve from a first material and having a generally cylindrical surface adapted to receive a piston, said sleeve having an end surface to be machined and when so machined to form a surface to cooperate with a compression seal, and plating said inner surface in a manner to prevent removal of said plating upon machining of said end surface by terminating the plating short of the end of the sleeve, the sleeve being provided with a bore having a diameter greater than the finished bore diameter of the liner and which has a smaller diameter portion adjacent its upper end with the plating only being formed on the larger diameter portion.

13. A method of making a cylinder liner for a reciprocating machine comprising forming a sleeve from a first material and having a generally cylindrical surface adapted to receive a piston, said sleeve having an end surface to be machined and when so machined to form a surface to cooperate with a compression seal, and plating said inner surface in a manner to prevent removal of said plating upon machining of said end surface by terminating the plating short of the end of the sleeve, the plating being initially formed on the entire inner surface of the cylindrical sleeve and is machined off of the top end thereof prior to machining of the top end.

14. A method as set forth in claim 13 wherein the cylindrical sleeve is provided with a smaller diameter portion adjacent its upper end which smaller diameter portion is less than the finished bore diameter and the larger diameter portion spaced from the upper end, which portion is larger than the finished bore diameter, and the plating is formed to a substantially uniform thickness on both ends and wherein the plating from the top end portion and a portion of the top end is removed on finished honing.

* * * * *